United States Patent
Ben Zakai et al.

(10) Patent No.: US 12,277,209 B2
(45) Date of Patent: Apr. 15, 2025

(54) INTERACTIVE SECURITY ORCHESTRATION

(71) Applicant: Unbiased Security Ltd., Ramat Gan (IL)

(72) Inventors: David Ben Zakai, Ramat Gan (IL); Eldar Kleiner, Tel Aviv (IL); Guy Guzner, Tel Aviv (IL); Yoav Horman, Tel-Aviv (IL)

(73) Assignee: Security Savvy Ltd., Ramat Gan (IL)

( * ) Notice: Subject to any disclaimer, the term of this patent is extended or adjusted under 35 U.S.C. 154(b) by 265 days.

(21) Appl. No.: 17/839,550

(22) Filed: Jun. 14, 2022

(65) Prior Publication Data

US 2023/0401308 A1 Dec. 14, 2023

(51) Int. Cl.
| G06F 21/00 | (2013.01) |
| G06F 8/40 | (2018.01) |
| G06F 21/52 | (2013.01) |

(52) U.S. Cl.
CPC ............ G06F 21/52 (2013.01); G06F 8/40 (2013.01); *G06F 2221/033* (2013.01)

(58) Field of Classification Search
None
See application file for complete search history.

(56) References Cited

U.S. PATENT DOCUMENTS

| 8,578,499 | B1 | 11/2013 | Zhu et al. |
| 9,241,004 | B1 | 1/2016 | April |
| 9,384,345 | B2 | 7/2016 | Dixon et al. |
| 9,635,042 | B2 | 4/2017 | Brown et al. |
| 9,674,145 | B2 | 6/2017 | Chien |
| 10,257,182 | B2 | 4/2019 | Child et al. |
| 10,805,314 | B2 | 10/2020 | Jakobsson et al. |
| 10,904,218 | B2 | 1/2021 | Muttik |
| 11,089,005 | B2 | 8/2021 | Ford et al. |
| 11,178,188 | B1* | 11/2021 | Wu .......................... H04L 63/20 |
| 2010/0186088 | A1* | 7/2010 | Banerjee ............. H04L 63/1433 709/224 |
| 2010/0250779 | A1* | 9/2010 | B'Far ...................... G06F 21/10 715/234 |
| 2015/0074390 | A1* | 3/2015 | Stoback .............. H04L 63/1483 713/156 |
| 2018/0091453 | A1 | 3/2018 | Jakobsson |
| 2020/0097337 | A1* | 3/2020 | Borkar .................... H04L 67/02 |
| 2020/0213336 | A1* | 7/2020 | Yu ....................... H04L 63/1425 |

FOREIGN PATENT DOCUMENTS

EP 3422236 B1 6/2022

OTHER PUBLICATIONS

International Application PCT/IB2023/054512 Search Report dated Jul. 30, 2023.

(Continued)

*Primary Examiner* — Andrew J Steinle
(74) *Attorney, Agent, or Firm* — Meitar Patents Ltd.; Daniel Kligler

(57) ABSTRACT

A method includes providing auxiliary code implementing a process for facilitating enforcement of one or more computer-usage rules, and augmenting third-party code with the auxiliary code such that execution of the third-party code carries out the process. Other embodiments are also described.

20 Claims, 4 Drawing Sheets

(56) References Cited

OTHER PUBLICATIONS

Stackoverflor, "Configure Silent Authentication in Open ID Connect", pp. 1-2, Aug. 11, 2020, as downloaded from https://stackoverflow.com/questions/63351761/configure-silent-authentication-in-open-id-connect.
Meta, "Silent authentication on session expiration with oAuth2 plugin", p. 1, Jan. 30, 2023, as downloaded from https://meta.discourse.org/t/silent-authentication-on-session-expiration-with-oauth2-plugin/253349.
Chrome Developers, "User identification", pp. 1-10, May 14, 2018, as downloadd from https://developer.chrome.com/docs/apps/app_identity/.
Wikipedia, "Salt (cryptography)," pp. 1-3, last edited Feb. 21, 2024.
Mozilla.org, "Web APIs—FileReaderSync," mdn web docs, pp. 1-3, years 1998-2024, as downloaded from https://developer.mozilla.org/en-US/docs/Web/API/FileReaderSync.
Mozilla.org, "Web APIs—File," mdn web docs, pp. 1-3, years 1998-2024, as downloaded from https://developer.mozilla.org/en-US/docs/Web/API/File.
Wikipedia, "NTFS," pp. 1-27, last edited May 30, 2024.
Microsoft, "Microsoft Information Protection (MIP) SDK—setup and configuration," pp. 1-11, Jan. 30, 2024.

\* cited by examiner

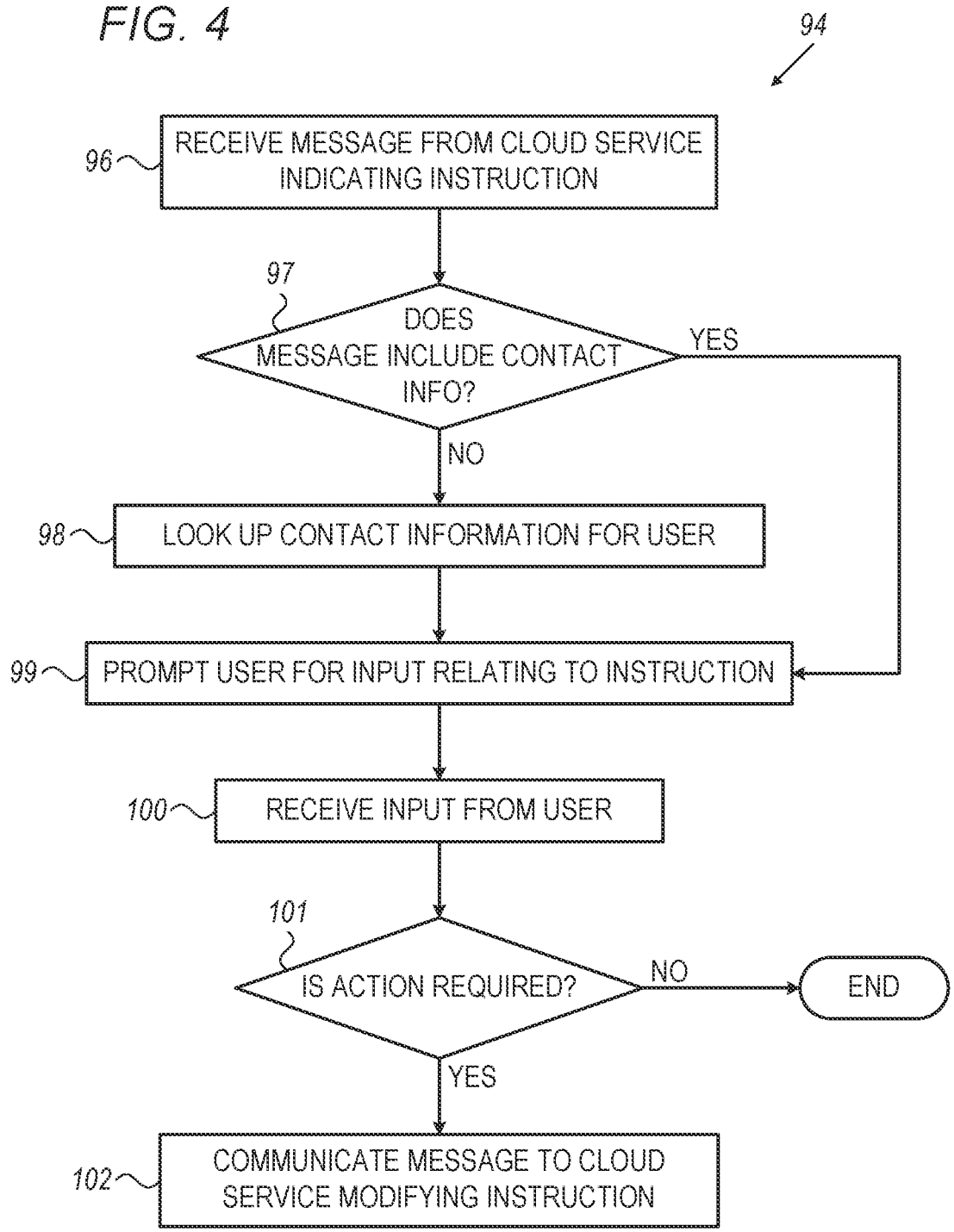

US 12,277,209 B2

INTERACTIVE SECURITY ORCHESTRATION

FIELD OF THE INVENTION

The present invention is related to the field of computer security.

BACKGROUND

U.S. Pat. No. 9,384,345 describes methods and systems involving receiving a request for web content from a client computing facility, presenting the web content, and retrieving indicia of a reputation assessment of the web content and delivering the indicia to the client computing facility in coordination with delivery of the web content to the client computing facility.

U.S. Pat. No. 10,805,314 describes a method in which information of an electronic message to be delivered to an intended recipient is received. For an original resource identifier included in the electronic message, a corresponding alternative resource identifier that can be at least in part used to obtain the original resource identifier and obtain context information associated with the electronic message is determined. The original resource identifier included in the electronic message is replaced with the alternative resource identifier to generate a modified electronic message. The modified electronic message with the alternative resource identifier is allowed to be delivered to the intended recipient instead of the electronic message with the original resource identifier. A request made using the alternative resource identifier in the modified message triggers a security action based at least in part on the context information associated with the electronic message.

SUMMARY OF THE INVENTION

There is provided, in accordance with some embodiments of the present invention, a system including a network interface and a processor. The processor is configured to augment third-party code, via the network interface, with auxiliary code implementing a process for facilitating enforcement of one or more computer-usage rules, such that execution of the third-party code carries out the process.

In some embodiments, the process includes prompting a user for input relating to the execution of the third-party code and facilitating the enforcement based on the input.

In some embodiments, facilitating the enforcement includes:
passing the input to a machine-learned algorithm, and
enforcing the computer-usage rules based on an output of the algorithm.

In some embodiments, the process includes notifying a user of the computer-usage rules.

In some embodiments, the computer-usage rules regulate sharing of information by a user.

In some embodiments, the computer usage rules restrict content allowed to be accessed by a user.

In some embodiments, the third-party code is contained in a Hypertext Transfer Protocol (HTTP) response received via the network interface, and the processor is configured to augment the third-party code by injecting the auxiliary code into the HTTP response.

In some embodiments,
the third-party code defines an application, and
the auxiliary code defines an extension to the application, the extension being configured to execute the process.

In some embodiments,
the application includes an email application,
the execution of the third-party code displays an email, and
the process includes modifying the email prior to the display of the email.

In some embodiments, the process further includes undoing the modifications to the email responsively to input from a user.

In some embodiments, the execution of the third-party code renders a webpage, and the process includes modifying the webpage prior to the rendering of the webpage.

In some embodiments, the process further includes undoing the modifications to the webpage responsively to input from a user.

There is further provided, in accordance with some embodiments of the present invention, a system including a network interface and a processor. The processor is configured to receive from a cloud service, via the network interface, a message indicating an instruction from a computer to the cloud service. The processor is further configured to prompt a user of the computer, in response to receiving the message, for input relating to the instruction. The processor is further configured to facilitate enforcement of one or more computer-usage rules with respect to the instruction, based on the input.

In some embodiments, the message is a first message, and the processor is configured to facilitate the enforcement of the computer-usage rules by communicating, to the cloud service, a second message that modifies the instruction.

In some embodiments, the message includes a username of the user, and the processor is configured to prompt the user by:
based on the username, ascertaining that the user is logged in to the computer, and
in response to ascertaining that the user is logged in to the computer, prompting the user via an application running on the computer.

There is further provided, in accordance with some embodiments of the present invention, a method including providing auxiliary code implementing a process for facilitating enforcement of one or more computer-usage rules, and augmenting third-party code with the auxiliary code such that execution of the third-party code carries out the process.

There is further provided, in accordance with some embodiments of the present invention, a method including receiving, from a cloud service, a message indicating an instruction from a computer to the cloud service. The method further includes, in response to receiving the message, prompting a user of the computer for input relating to the instruction. The method further includes, based on the input, facilitating enforcement of one or more computer-usage rules with respect to the instruction.

The present invention will be more fully understood from the following detailed description of embodiments thereof, taken together with the drawings, in which:

BRIEF DESCRIPTION OF THE DRAWINGS

FIG. 4 is a flow diagram for an algorithm for security orchestration for cloud services, in accordance with some embodiments of the present invention.

DETAILED DESCRIPTION OF EMBODIMENTS

Overview

Figure 1:
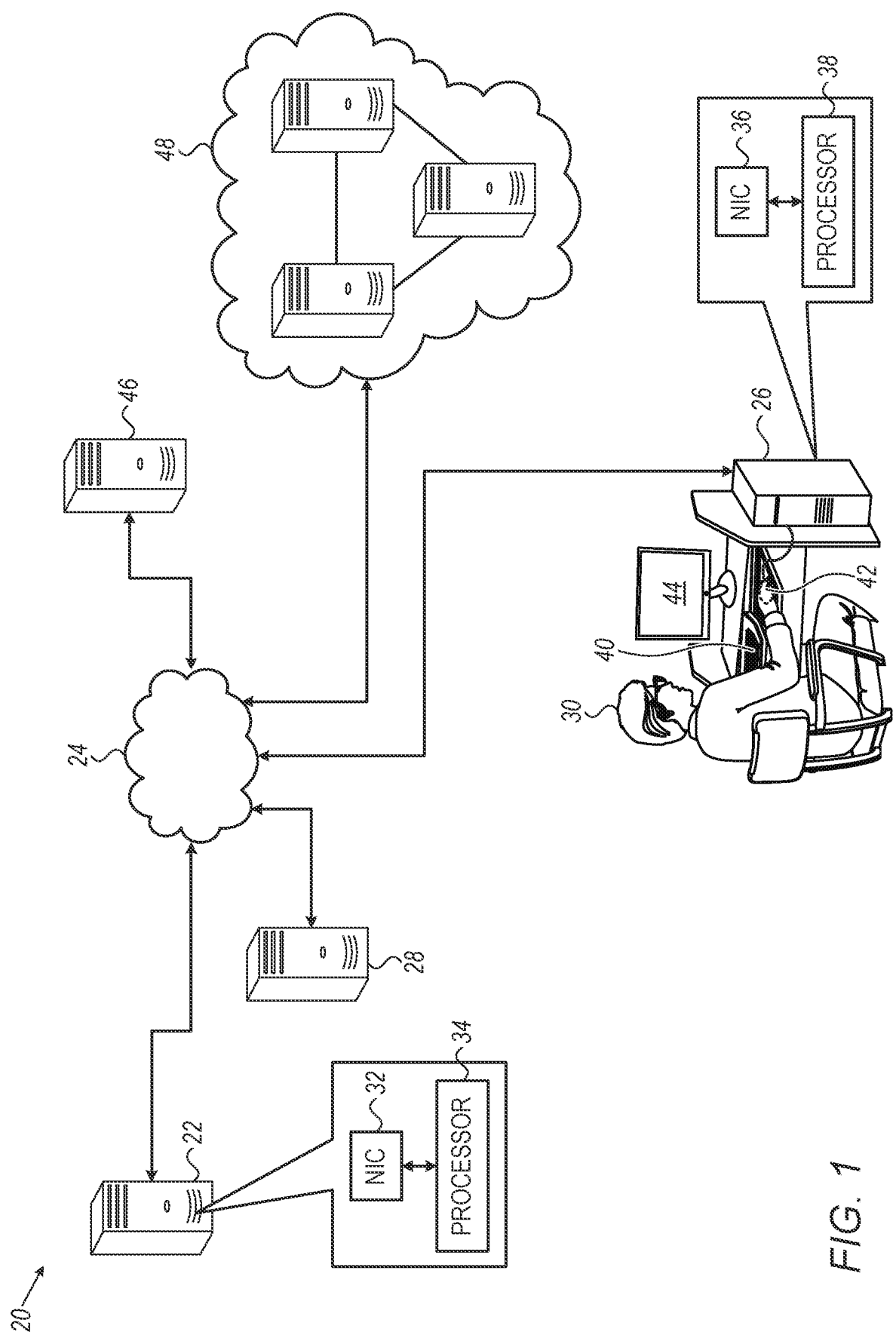
FIG. 1 is a schematic illustration of a system for security orchestration, in accordance with some embodiments of the present invention.

An organization may define computer-usage rules regulating activities performed by users associated with the organization. For example, the rules may specify types of content to which the organization does not allow access, or types of websites to which the organization does not allow credentials or other sensitive information to be posted. Alternatively additionally, the rules may regulate the sharing of sensitive data. For example, the rules may specify the conditions under which sensitive files may be shared.

However, it is often difficult for users to act in accordance with such rules. For example, upon encountering a phishing website (e.g., via a link in an email), a user may enter his credentials, due to erroneously thinking that the website is legitimate. As another example, a user may upload a file to a file-sharing website, forgetting that, due to the file containing sensitive information, the file should be shared only with certain users and/or only with a suitably close expiration date, such that the file cannot be downloaded beyond the expiration date.

To address chis challenge, embodiments of the present invention provide a server configured to provide auxiliary code for implementing a process for facilitating enforcement of one or more computer-usage rules, and to augment third-party code with the auxiliary code. For example, the auxiliary code may be injected into a Hypertext Transfer Protocol (HTTP) response or added as an extension to an application. When the auxiliary code is executed by the user's computer, the user may be notified of the relevant computer-usage rules and/or inhibited from performing activities that may contravene the rules. For example, execution of the code may cause input fields on a website to be disabled, and/or links or other content on the website co be hidden or modified. As another example, execution of the code may cause an expiration date to be automatically associated with a file that was uploaded, by the user, to a file-sharing website.

Typically, the process implemented by the auxiliary code is interactive, in that the process prompts the user for input and facilitates enforcement of the computer-usage rules based on the input. For example, the input may be passed to a machine-learned algorithm, and action for facilitating enforcement of the rules may then be taken based on the output of the algorithm. Thus, for example, a machine-learned algorithm may decide if a particular website or email is phishing for sensitive information based on the user's input regarding the content of the website or email. If the algorithm returns a high likelihood of phishing, the user may be reminded of the relevant rules regarding phishing and/or inhibited from submitting sensitive information.

In other embodiments, the server facilitates enforcement of the computer-usage rules with respect to instructions communicated to a cloud service, even without augmenting any third-party code. For example, the server may receive, from a file-sharing or instant-messaging cloud service, a message indicating that a user is uploading particular content to the service. In response thereto, the server may prompt the user for information regarding the content and/or regarding the intended recipient of the content. In response to this information, the server may notify the user of any relevant computer-usage rules and/or instruct the cloud service, via another message, to delete or modify the uploaded content.

Given that, typically, many of the computer-usage rules in an organization relate to information security, the server may be said to provide "security orchestration." Nonetheless, it is emphasized that embodiments of the present invention may be used to facilitate the enforcement of any type of computer-usage rule.

In the context of the present application, including the claims, the term "code" includes, within its scope, any type of code, script, or markup, which may be written in any suitable language such as C, C++, C#, Java, Python, JavaScript, TypeScript, or the HyperText Markup Language (HTML).

In the context of the present application, including the claims, the "execution" of code may include the performance of any process by a computer responsively to reading the code or any compilation thereof. For example, a web browser rendering a webpage may be said to "execute" the HTML that defines the webpage. The code is said to "implement" the process that is performed when the code is executed.

In the context of the present application, including the claims, an "extension" to an application may include any module that extends the functionality of the application, including a plugin, an add-in, or an add-on.

System Description

Reference is initially made to FIG. 1, which is a schematic illustration of a system 20 for security orchestration, in accordance With some embodiments of the present invention.

System 20 comprises at least one server 22 comprising a communication interface 32, such as a network interface controller (NIC), and a processor 34. Via communication interface 32, processor 34 exchanges communication over a computer network 24, such as the Internet.

FIG. 1 depicts a user 30 using a computer 26, which may comprise, for example, a desktop computer, a laptop, computer, a tablet computer, or a smartphone. Computer 26 comprises a communication interface 36, such as a NIC, a processor 38, and one or more input/output (I/O) interfaces such as a keyboard 40, a mouse 42, or a display 44. Computer 26 may belong to another network, such as a local area network (LAN), that is separate from network 24.

Processor 38 is configured to execute various applications on computer 26, and user 30 may interact with the applications via the I/O interfaces.

For example, processor 38 may execute an email application. The email application may retrieve emails over network 24, via communication interface 36, from an email server 28, and display the emails on display 44. Example email applications include Microsoft Outlook and Gmail by Google.

As another example, processor 38 may execute a web browser. The web browser may retrieve content over network 24, via communication interface 36, from a web server 46, and display the content on display 44. Example web browsers include Mozilla Firefox, Microsoft Edge, and Google Chrome.

As another example, processor 38 may execute any application configured to communicate over network 24, via communication interface 36, with a cloud service 48. Examples of such applications include file-sharing applications (e.g., Dropbox) and instant-messaging applications (e.g., Slack). It is noted that cloud service 48 may be provided by a single server, or by multiple interconnected servers as shown in FIG. 1. It is further noted that email server 28, or a plurality of interconnected email servers, may provide a cloud service.

One or more computer-usage rules regulate the actions performed by user 30 on computer 26. For example, user 30 may be associated with an organization (such as a school or a workplace) for which the computer-usage rules have been defined.

For example, the computer-usage rules may regulate sharing of information by user 30. For example, the rules may prohibit the user from entering his credentials or other sensitive information on certain websites. Alternatively or additionally, the rules may prohibit the user from communicating sensitive files over network 24, or may require that any such communication is encrypted and/or is reported to a compliance department. As a specific example, the user may be allowed to download files from a file-sharing website, but not to upload files to the website.

As another example, the computer-usage rules may restrict the content that user 30 is allowed to access. For example, the user may be prohibited from accessing certain websites.

As yet another example, the computer usage rules may restrict accepting certain Open Authentication (OAuth) permissions, alternatively referred to as "scopes."

As described in detail below, processor 34 is configured to provide auxiliary code implementing a process for facilitating enforcement of the computer-usage rules, and to augment third-party code (i.e., code that is not provided by server 22, but rather, is provided by any other party) with the auxiliary code such that execution of the third-party code carries out the process. Typically, the process includes an interaction with the user, whereby the user is asked to input information relevant to the rules.

In some embodiments, the auxiliary code implements the process via the application that is defined or controlled by the third-party code. For example, as described below with reference to FIG. 2, the third-party code may include HTML and/or JavaScript that controls the content displayed on a web browser, and the auxiliary code may implement an interaction with the user via a dialog window displayed on the web browser. As another example, the third-party code may define an instant-messaging application, and the auxiliary code may implement an interaction with the user via the instant-messaging application.

In other embodiments, the auxiliary code implements the process via a different application. For example, upon execution of the third-party code and auxiliary code by computer 26, the user may receive a phone call or text message reminding the user of the computer-usage rules and/or querying the user for input relating to the execution.

In some embodiments, the auxiliary code causes computer 26 to open a communication channel (e.g., a WebSocket) with the server. The auxiliary code may then exchange communication with the server, over the communication channel, when implementing the process. For example, as described below with reference to FIG. 2, the auxiliary code may submit input to a machine-learned algorithm executed on the server, and receive output from the algorithm. As another example, the auxiliary code may retrieve the latest version of the computer-usage rules from the server.

In general, each of the processors described herein may be embodied as a single processor, or as a cooperatively networked or clustered set of processors. The functionality of any one of the processors may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, any one of the processors described herein may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Facilitating Enforcement of Computer-Usage Rules

Figure 2:
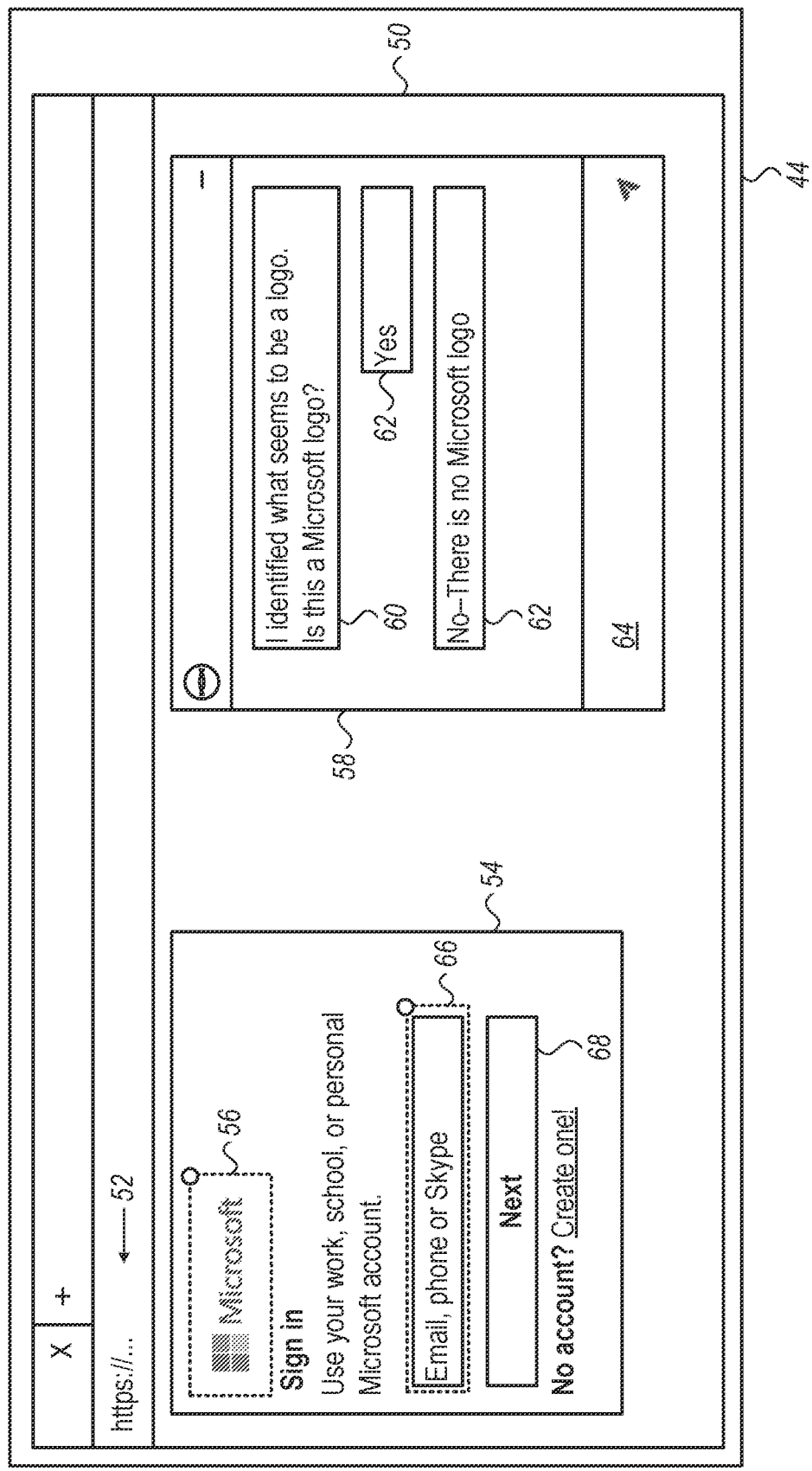
FIG. 2 is a schematic illustration of an augmented website, in accordance with some embodiments of the present invention.

Reference is now made to FIG. 2, which is a schematic illustration of an augmented website, in accordance with some embodiments of the present invention.

In some embodiments, the auxiliary code implements a process for prompting the user for input relating to the execution of the third-party code and facilitating enforcement of the computer-usage rules based on the input.

For example, FIG. 2 depicts a scenario in which display 44 displays a web-browser window 50. The web browser is pointing to a particular Uniform Resource Locator (URL) 52 at which a webpage including a sign-in form 54 is located.

In such a scenario, the auxiliary code may cause the web browser to display a dialog window 58 that prompts the user for input relating to sign-in form 54. For example, dialog window 58 may display a question 60 regarding the sign-in form. The user may answer question 60 by clicking on a button 62 and/or inputting text into an input field 64. Any number of subsequent questions may then be asked.

Based on the input provided by the user, the auxiliary code may facilitate enforcement of the computer-usage rules by warning the user that sign-in form 54 may not be legitimate, and/or preventing the user from entering information on the sign-in form.

For example, the auxiliary code, by calling a logo-identifying routine (executed, for example, on server 22 (FIG. 1)), may identify a logo 56 contained in the sign-in form. In response thereto, the auxiliary code may check whether URL 52 belongs to a domain associated with logo 56. For example, for a Microsoft logo, the auxiliary code may check whether URL 52 belong to the Microsoft domain. If not, the auxiliary code may ask the user whether the webpage indeed shows the identified logo. If the user confirms that the identified logo is shown, dialog window 58 may warn the user that sign-in form 54 is likely illegitimate.

For cases in which execution of the third-party code renders a webpage as in FIG. 2, the process implemented by the auxiliary code may include modifying the webpage prior to the rendering of the webpage. Advantageously, by virtue of the modifications being performed by the auxiliary code as the auxiliary code is executed by the browser, even dynamically-rendered webpages may be modified.

For example, as described above, execution of the third-party code may cause dialog window 58 to be added to the webpage. Alternatively or additionally, input fields or buttons on the webpage may be disabled, content on the webpage may be obfuscated, and/or links on the webpage may be modified, so as to facilitate enforcing the computer-usage rules. Subsequently, in response to input from the user, the modifications may be undone.

For example, supposing that sign-in form 54 includes an input field 66 for entering an account identifier and a button 68 for submitting the identifier, the auxiliary code may cause input field 66 and/or button 68 to be disabled. Subsequently, if the auxiliary code confirms, based on the user's input, that the logo shown above the input field does not match the URL, the input field and/or button may remain disabled. Otherwise, the input field and/or button may be reenabled.

In some cases, the auxiliary code causes the user's input (entered, for example, via dialog window 58) to be passed to a machine-learned algorithm, which may be executed, for example, on server 22 (FIG. 1). Subsequently, enforcement of the computer-usage rules may be facilitated based on an output of the algorithm.

For example, a machine-learned algorithm may be trained to identify a website as a phishing website based on various parameters, including an input from the user indicating the urgency with which a request for sensitive information is presented on the website. In such a case, dialog window 58 may prompt the user for an input indicating the urgency, e.g., by asking the user to rank the urgency on a numerical scale. Subsequently to the algorithm receiving the user's input, the algorithm may output a likelihood of phishing. If the likelihood exceeds a predefined threshold, the user may be warned, and/or input fields on the website may be disabled.

In other embodiments, the auxiliary code, when executed, notifies the user of the computer-usage rules and/or enforces the rules even without any input from the user. For example, in the scenario depicted in FIG. 2, following the disabling of input field 66 and button 68, dialog window 58 may simply remind the user that his credentials should not be entered into sites that are potentially malicious.

Augmentation to HTTP Responses

In some embodiments, processor 34 (FIG. 1) receives an HTTP response designated for computer 26, augments third-party code contained in the response (e.g., so as to modify a webpage as illustrated in FIG. 2), and then sends the augmented response to the computer. Thus, advantageously, even if the user accesses a website that was not previously known to the organization, the computer-usage rules may be enforced with respect to usage of the website.

To facilitate receiving the HTTP response, server 22 (FIG. 1) may act as a proxy for computer 26, such that all communication between the computer and network 24 passes through server 22. For example, serves 22 may act as a cloud proxy for a network to which computer 26 belongs, such that all communication between the network and network 24 passes through the server.

Figure 3:
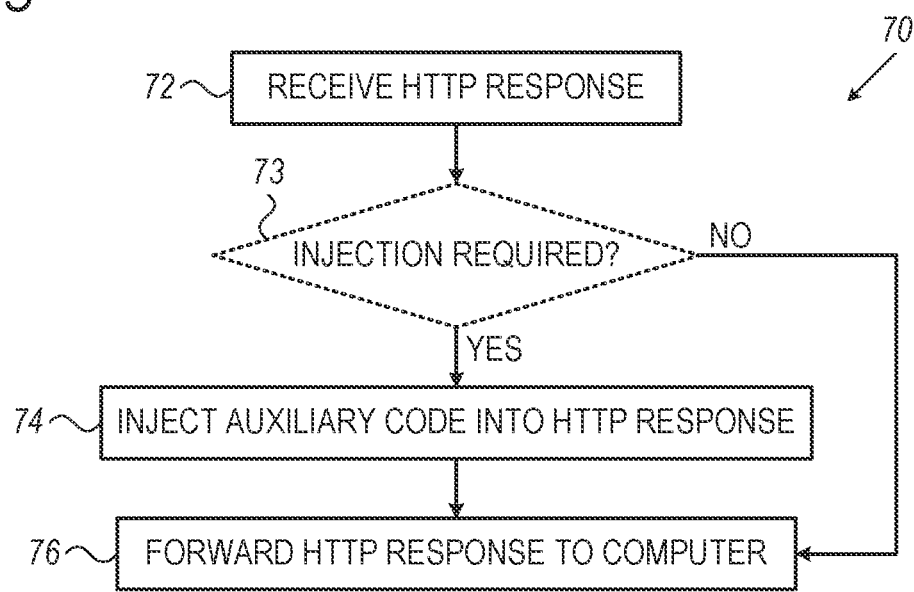
FIG. 3 is a flow diagram for an algorithm for augmenting third-party code contained in a Hypertext Transfer Protocol (HTTP) response, in accordance with some embodiments of the present invention.

For further details regarding HTTP injections, reference is now made to FIG. 3, which is a flow diagram for an algorithm 70 for augmenting third-party code contained in an HTTP response, in accordance with some embodiments of the present invention.

Algorithm 70 begins with a response-receiving step 72, at which the processor receives the HTTP response. Subsequently, the processor, at an optional assessing step 73, may assess whether an injection into the HTTP response is required. For example, the processor may query any suitable online source for the reputation of the website from which the HTTP response was received. If the website does not have a safe reputation and the HTTP response contains code (including, for example, HTML and/or JavaScript) defining a webpage, the processor may decide that an injection is required.

If an injection is required, the processor, at a code-injecting step 74, augments the third-party code in the HTTP response by injecting auxiliary code into the HTTP response. For example, the processor may inject a function (e.g., a JavaScript or TypeScript function) that displays an interactive dialog window on the webpage, e.g., as described above with reference to FIG. 2.

Subsequently, or if no injection is required, the processor forwards the HTTP response to computer 26 (FIG. 1) at a response-forwarding step 76.

Alternatively or additionally to injecting the auxiliary code, the processor may make other modifications to the HTTP response prior to response-forwarding step 76. For example, the processor may modify static links and/or disable static fields defined in the response. If the HTTP response contains a file (rather than code defining a webpage), the processor may remove the file.

Augmentation by Application Extension

In some embodiments, the third-party code defines an application, and the auxiliary code defines an extension to the application, the extension being configured to execute a process for facilitating enforcement of one or more computer-usage rules.

For example, processor 34 (FIG. 1) may augment code defining a web browser on computer 26 with auxiliary code defining an extension to the web browser. (In other words, the processor may, via network interface 32, install the browser extension on computer 26.) The extension may display, and execute the functionality of, dialog window 58, as described above with reference to FIG. 2. Alternatively or additionally, the extension may make her modifications to webpages loaded in the browser, such as by disabling input fields.

For example, the extension may be configured to inject, into any HTTP response received by the browser, additional auxiliary code configured to display and execute the functionality of dialog window 58 and/or make other modifications to the webpage defined in the HTTP response. As described above with reference to FIG. 1, the additional auxiliary code may be configured to communicate with server 22, such that the additional auxiliary code may execute this functionality in response to output from any algorithms (e.g., machine-learned algorithms) executed on the server.

As another example, the processor may augment code defining an online-communication (e.g., videoconferencing) application on the computer with auxiliary code defining an extension to the online-communication application. The extension may notify the user of the computer-usage rules, and/or collect input from the user, via a dedicated dialog window (similar to dialog window 58 of FIG. 2) or via a preexisting chat facility belonging to the application. Thus, for example, the extension may notify the user that, per the computer-usage rules, the user's video conference should be recorded. Alternatively or additionally, if the user instructs the application to share a file with another user, the extension may ask the user for input regarding the content of the file, and then allow or disallow the sharing of the file n response to the input.

As yet another example, the processor may augment code defining an email application with auxiliary code defining an extension to the email application. Prior to the email application displaying an email, the extension may modify the email, e.g., by obfuscating content, modifying links, and/or removing attachments. Alternatively or additionally, the extension may query the user (e.g., via a dedicated dialog window) for input regarding the email. For example, the extension may ask the user if the user recognizes the sender of the email and/or whether a request for information contained in the email is written with an urgent tone. Subsequently, responsively to the input, the extension may retain or undo any modifications that were made to the email, and/or notify the user of the relevant rules.

Security Orchestration for Cloud Services

Reference is now made to FIG. 4, which is a flow diagram for an algorithm 94 for security orchestration for cloud services, in accordance with some embodiments of the present invention. Algorithm 94 may be executed by processor 34 (FIG. 1) so as to facilitate enforcement of one or more computer-usage rules with respect to instructions communicated from computer 26 to cloud service 48. To facilitate the performance of algorithm 94, server 22 may be connected to an API for the cloud service.

Algorithm 94 begins at a message-receiving step 96, at which the processor receives, from the cloud service, a message indicating an instruction from computer 26 to the cloud service. In response to receiving the message, the processor checks, at a checking step 97, whether the message includes contact information for user 30 (FIG. 1), i.e., any identifier that can be used to contact the user.

For example, if the user logged in to the cloud service using his email address, the message may include the email address, which may be used to contact the user via email. As another example, if the user accessed the cloud service via a single sign-on (SSO) directory service, the message may include the username under which the user logged in to the directory service. This username may be used to contact the user via an application running on the computer, as further described below.

If the message does not include any contact information for the user, the processor, at a lookup step 98, looks up contact information for the user based on an identifier contained in the message. For example, given the user's username, the processor may look up (in an organization-wide directory, for example) contact information, such as an email address or phone number, associated with the username.

Subsequently to looking up the contact information, or if no lookup is required, the processor, at a prompting step 99, prompts the user for input relating to the instruction.

For example, if the contact information includes an email address or a phone number, the processor may prompt the user via an email, a text message, or a phone call. For cases in which the processor prompts the user via an email or a text message, the email or text message may contain a link to a website at which the input may be submitted; alternatively, the input may be submitted via a return email or text message. For cases in which the processor prompts the user via a phone call, the user may submit the input by pressing on the appropriate phone keys.

As another example, if the contact information includes a username, such as an SSO username, of the user, the processor may prompt the user via a messaging application (e.g., Slack) in which the user is identified by the username. The user may then submit the input via the application.

Alternatively, the processor may ascertain, based on the username, that the user is logged in to computer 26. In response thereto, the processor may prompt the user via an application running on the computer. For example, an extension to a browser, which is in communication with the server over a communication channel (e.g., a WebSocket), may run on computer 26. In response to ascertaining that the user is logged in to computer 26, the processor may prompt the user by instructing the browser, via the communication channel, to display the prompt. The user may then submit the input via the browser.

Subsequently, at an input-receiving step 100, the processor receives the input from the user. Next, based on the input, the processor decides, at a deciding step 101, whether action is required to facilitate enforcement of one or more computer-usage rules with respect to the instruction. If yes, the processor performs the required action. For example, the processor may, at a message-communicating step 102, communicate another message, which modifies the instruction (i.e., contains a new instruction causing a result different from the intended result of the original instruction), to the cloud service. Alternatively or additionally, the processor may notify the user of the computer-usage rules. For example, if the input was submitted via a website as described above, the website may display the rules. If the input was submitted via phone, the rules may be conveyed auditorily over the phone.

For example, if the message received at message-receiving step 96 indicates an instruction to a file-sharing service to upload a file, the processor may prompt the user for information regarding the content of the file and/or the identity of the other users with whom the file is being shared. If, based on the user's input, the processor ascertains that, per the computer-usage rules, the file should not be shared, the processor may communicate another message to the cloud service, instructing the service to reject the upload or to erase the file following the upload. Alternatively, if the rules require that the file be encrypted, the processor may instruct the service co communicate the file to the processor, and the processor may then encrypt the file before returning the file to the service. Alternatively or additionally to encrypting the file, the processor may instruct the service to place an expiration date on the file in accordance with the rules. Alternatively or additionally, the processor may notify the user that sensitive files may be shared only with certain other users, only if encrypted, and/or only with a suitably close expiration date.

Similarly, for a code-repository cloud service, the processor may prompt the user for information regarding the code that the user is uploading. Based on the user's input, the processor may instruct the service to reject the upload, erase the code following the upload, or communicate the code to the processor (e.g., so that the processor may encrypt the code before returning the code to the service). Alternatively or additionally, the processor may notify the user of the relevant computer-usage rules pertaining to the uploading of code.

Similarly, if the initial message indicates an instruction to an instant-messaging service to upload content, the processor may prompt the user (e.g., via the same instant-messaging application) for information regarding the content and/or the identity of the other users with whom the content is being shared. If, based on the user's input, the processor ascertains that, per the computer-usage rules, the content should not be shared, the processor may communicate another message to the cloud service, instructing the service to reject the upload, erase the content following the upload, or communicate the content to the processor. Alternatively or additionally, the processor may not the user (e.g., via the same instant-messaging application) of the relevant computer-usage rules.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a network interface; and
a processor, configured to:
receive from a cloud service, via the network interface, a message indicating an instruction requested from a user of a computer to perform a particular action on the cloud service or to upload particular content to the cloud service,
in response to receiving the message:
i) determine contact information for the user, and
ii) prompt, using the contact information, the user for input being additional information about the requested instruction, and
based on the input, facilitate enforcement of one or more computer-usage rules with respect to the instruction.

2. The system according to claim 1, wherein the message is a first message, and wherein the processor is configured to facilitate the enforcement of the computer-usage rules by communicating, to the cloud service, a second message that modifies the instruction.

3. The system according to claim 2, wherein the second message instructs the cloud service to reject the upload, delete the particular content, or place an expiration date on the particular content.

4. The system according to claim 2, wherein the second message instructs the cloud service to send the particular content to the processor for encryption.

5. The system according to claim 2, wherein the processor is further configured to send the user a notification regarding the computer-usage rules with respect to the instruction.

6. The system according to claim 1, wherein the message includes a username of the user, and wherein the processor is configured to prompt the user by:
based on the username, ascertaining that the user is logged in to the computer, and
in response to ascertaining that the user is logged in to the computer, prompting the user via an application running on the computer.

7. The system according to claim 1, wherein determine contact information for the user comprises:
determine that the message includes the contact information, or determine that the message includes an identifier for the user and using the identifier to obtain the contact information.

8. The system according to claim 1, wherein the contact information includes at least one of a phone number, email address, and username for a single sign-on (SSO) directory service.

9. The system according to claim 1, wherein prompt the user comprises at least one of phone the user, text the user, email the user, message the user through a messaging application, and send the user a message through an application running on the computer.

10. The system according to claim 1, wherein the cloud service is a file-sharing, instant-messaging, or code-repository cloud service.

11. A method, comprising, by a processor of a first computer:
receiving, from a second computer implementing a cloud service, a message indicating an instruction requested from a user of a third computer to perform a particular action on the cloud service or to upload particular content to the cloud service;
in response to receiving the message:
ii) determining contact information for the user, and
iii) prompting, using the contact information, the user for input being additional information about the requested instruction; and
based on the input, facilitating enforcement of one or more computer-usage rules with respect to the instruction.

12. The method according to claim 11, wherein the message is a first message, and wherein facilitating the enforcement of the computer-usage rules comprises communicating, to the cloud service, a second message that modifies the instruction.

13. The method according to claim 11, wherein the message includes a username of the user, and wherein prompting the user comprises:
based on the username, ascertaining that the user is logged in to the third computer; and
in response to ascertaining that the user is logged in to the third computer, prompting the user via an application running on the third computer.

14. The method according to claim 11, wherein determining contact information for the user comprises:
determining that the message includes the contact information, or determining that the message includes an identifier for the user and using the identifier to obtain the contact information.

15. The method according to claim 11, wherein the contact information includes at least one of a phone number, email address, and username for a single sign-on (SSO) directory service.

16. The method according to claim 11, wherein prompting the user comprises at least one of phoning the user, texting the user, emailing the user, messaging the user through a messaging application, and sending the user a message through an application running on the third computer.

17. The method according to claim 11, wherein the cloud service is a file-sharing, instant-messaging, or code-repository cloud service.

18. The method according to claim 12, wherein the second message instructs the cloud service to reject the upload, delete the particular content, or place an expiration date on the particular content.

19. The method according to claim 12, wherein the second message instructs the cloud service to send the particular content to the first computer for encryption.

20. The method according to claim 12, further comprising sending the user a notification regarding the computer-usage rules with respect to the instruction.

* * * * *